US009491318B2

(12) United States Patent
Swire et al.

(10) Patent No.: US 9,491,318 B2
(45) Date of Patent: Nov. 8, 2016

(54) AUTOMATICALLY GENERATED VISUAL ANNOTATED GRAPHIC LEGEND

(71) Applicant: Kodak Alaris Inc., Rochester, NY (US)

(72) Inventors: Alan Swire, Pittsford, NY (US); Joseph A. Manico, Rochester, NY (US); Peter O. Stubler, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/685,133

(22) Filed: Apr. 13, 2015

(65) Prior Publication Data

US 2016/0301813 A1 Oct. 13, 2016

(51) Int. Cl.
| | |
|---|---|
| *H04N 1/46* | (2006.01) |
| *H04N 1/00* | (2006.01) |
| *G06K 9/00* | (2006.01) |
| *G06K 9/46* | (2006.01) |
| *H04N 1/21* | (2006.01) |
| *H04N 1/50* | (2006.01) |
| *G06F 15/00* | (2006.01) |
| *G06K 1/00* | (2006.01) |
| *G06F 3/12* | (2006.01) |

(52) U.S. Cl.
CPC ...... *H04N 1/00188* (2013.01); *G06K 9/00221* (2013.01); *G06K 9/4676* (2013.01); *H04N 1/00169* (2013.01); *H04N 1/00254* (2013.01); *H04N 1/2104* (2013.01); *H04N 1/50* (2013.01); *H04N 2201/0065* (2013.01)

(58) Field of Classification Search
CPC ............... H04N 1/00188; H04N 1/00254; H04N 1/2104; H04N 1/50; H04N 2201/0065; G06K 9/00221; G06K 9/4676

USPC ................ 358/501, 1.1, 1.13, 1.15
See application file for complete search history.

(56) References Cited

U.S. PATENT DOCUMENTS

| | | | |
|---|---|---|---|
| 2,225,307 A | 12/1940 | Kreeger | |
| 5,914,748 A | 6/1999 | Parulski et al. | |
| 6,198,544 B1 | 3/2001 | Wess et al. | |
| 6,697,502 B2 | 2/2004 | Luo | |
| 7,324,693 B2 | 1/2008 | Chen | |
| 8,280,164 B2 | 10/2012 | Luo et al. | |
| 8,715,177 B2* | 5/2014 | Rao | A61M 5/142 600/300 |
| 2002/0003631 A1 | 1/2002 | Abram et al. | |
| 2007/0067104 A1* | 3/2007 | Mays | G01C 21/36 701/437 |
| 2008/0284791 A1 | 11/2008 | Bressan et al. | |

OTHER PUBLICATIONS

F. Fleuret et al., "Stationary Features and Cat Detection," Journal of Machine Learning Research, 2007, pp. 1-36.
Y. Boykov et al., "Interactive Graph Cuts for Optimal Boundary & Region Segmentation of Objects in N-D Images," Proceedings of Internation Conference on Computer Vision, Vancouver, Canada, Jul. 2001, vol. I, pp. 105-112.
F. Yi et al., "Image Segmentation: A Survey of Graph-cut Methods," 2012 International Conference on Systems and Informatics (ICSAI 2012), Yantai, China, pp. 1936-1941.
Y. Yang et al., "Articulated pose estimation with flexible mixtures-of-parts," Computer Vision and Pattern Recognition (CVPR), 2011 IEEE Conference, pp. 1385-1932.

* cited by examiner

*Primary Examiner* — Douglas Tran
(74) *Attorney, Agent, or Firm* — Hogan Lovells US LLP

(57) ABSTRACT

A method for automatically generating a hardcopy photo product with a visual annotated graphic legend provides additional information related to the printed image without obscuring the printed image.

15 Claims, 16 Drawing Sheets

AUTOMATICALLY GENERATED VISUAL ANNOTATED GRAPHIC LEGEND

FIELD OF THE INVENTION

The present invention relates to methods for automatically generating a hardcopy photo product with a visual graphic legend to provide additional information related to the printed image.

BACKGROUND OF THE INVENTION

With soft display images presented on interactive devices such as personal computers, touch screen tablets, and smart phones, individual name tags that identify the people present in the recorded scene can be provided as an interactive layer. This interactive layer is only visible when the option is selected by the user, or the user touches the screen area relative to the individual of interest, or operates a pointing device to "hover over" the image of an individual. When this is done the name for the individual appears over or adjacent to the individual and disappears when the user returns to the normal viewing mode. This soft display feature provides a way to identify the individuals in a group scene without obscuring the individuals or scene elements with a permanent text overlay. The present invention provides this functionality in hard copy print formats.

Creating "coloring books" and "paint by numbers" drawings by converting consumer generated photos into line drawings is known and demonstrated by U.S. 20080284791A1 FORMING COLORING BOOKS FROM DIGITAL IMAGES. The line-art image is formatted to produce a coloring book image and the coloring book image is printed. In addition, this publication discloses that an index number may be assigned to a corresponding sample color and the index number and color may be printed with the coloring book image to produce a color-by-numbers coloring book image. U.S. 20080284791A1 does reference generating different types of content, such as silhouettes for unsupervised coloring, borders with numbered regions, and using a color photograph and the coloring book line drawing so that the combination image and line drawing comprises color photographic sections substituted for corresponding portions of the monochromatic line-art as part of the graphic user interface (GUI) to verify that the line image shapes and assigned colors are correct.

U.S. 20020003631 SYSTEM AND METHOD FOR PRODUCING A COLORING BOOK IMAGE FROM A DIGITAL IMAGE also describes techniques creating "coloring books" and "paint by numbers" drawings by converting consumer generated photos into line drawings color samples are generated from the digital image and a fixed or programmable palette of colors is assigned to image areas of the coloring book image. In addition, an index number is assigned to a corresponding sample color and the index number and color is printed with the coloring book image to produce a color-by-numbers coloring book image. The coloring book or color-by-numbers coloring book images can be combined with stock line-art images to generate a storyboard which may be printed in the form of a coloring book.

However, neither U.S. 20020003631 nor U.S. 20080284791, produces a line defining the outline each individual with the proper configuration indicating the relative depth or row in which the individuals within a scene are placed, or provide a means to identify those individuals without obscuring the original scene content on a printed hardcopy media. Typically this sort of graphically annotated group picture is professionally produced by graphic artists employing a range of specialized skills, image manipulation tools, and can be very costly for the customer. In addition, manually creating an annotated visual reference for use with a hardcopy scene image is a burdensome task requiring a diverse range of image editing and processing skills and is ill-suited for applications involving hardcopy photo products created with the use of smart phones, touch tablets, personal computers, and retail photo kiosks. These types of approaches for creating custom photo products assume that the user has no prior knowledge of image manipulation techniques or has any of the required image editing skills, but has the desire to purchase a custom photo product that meets their needs, easily and affordably. In the case of a retail photo kiosk, the user's time within the retail establishment for a "do-it-yourself" or "while-you-wait" service is inherently limited by the user's willingness to linger in a retail establishment for extended periods of time and the time available for working at the kiosk can be limited due to other users waiting in line for their turns at the device.

What is required is a means of indicating the identities of individuals in group scenes on hardcopy print media when viewed without obscuring, editing, or modifying elements of the original scene. An automatically generated annotated visual scene derived reference for use in association with the group scene, provides the identity information and a visual reference relative to the original scene. The annotated visual reference may be printed on the same side of the same media and adjacent to the original scene, on the back side of the same media as the original scene, in the same or difference scale, on a separate conventional or transparent media used in conjunction with the original scene print, on a multiple image viewing print media incorporating a barrier or lenticular overlay, or on a duplex translucent media with scene image on one side and an aligned and reverse printed annotated visual scene derived reference on the other side of the translucent media.

SUMMARY OF THE INVENTION

According to the present invention, a method of creating a hardcopy photo product of a recorded scene of a group of individuals includes obtaining an image of a scene with two or more individuals; using a processor to analyze the scene to automatically create a line graphic that outlines the individuals within the scene while maintaining their positions relative to the scene recording device; using the processor to extract the created line graphic image from the scene image; using the processor to obtain identification of individuals within the scene; using the processor to annotate the created line graphic image with the obtained identification information; using the processor to format the recorded scene image and the annotated line graphic image to produce a hardcopy photo product that includes the annotated line graphic image to provide visual identification information related to the individuals depicted in the scene image without obscuring the scene image; and producing the formatted hardcopy photo product. The identification of the individuals within the scene may be obtained from facial recognition, metadata related to the recorded scene image, a user operating a user input device, or information provided by a social network. According to the method of the present invention the two or more individuals within the scene can include people and/or animals, with individual name designations. The method of the present invention can be performed using a phone, tablet, personal computer, or retail photo kiosk either locally on the device or connected via a communications network to a remote processor. According to the method of the present invention the formatting of the photo product includes the scene image of one side of a print media and the annotated line graphic image on the other, the scene image and the annotated line graphic image on separate portions of the same side of a print media, the scene image printed on reflective media and the annotated line graphic image printed on a separate transparent print media, the scene image and a reduced scale version of the annotated line graphic image on separate portions of the same side of a print media, the scene image printed on reflective portion of a print media and the annotated line graphic image is reverse printed on an adjacent and attached transparent print media, the scene image and the annotated line graphic image are interspersed and printed on a lenticular or barrier multi-view print media, or the scene image printed on front surface translucent or transparent print media and the annotated line graphic image is reverse printed and aligned to the scene image on the rear surface of the translucent or transparent print media. The format for the photo product is selected from a group of softcopy displayed format options by the user. The analysis of the scene content to automatically create a line graphic that outlines the individuals within the scene maintaining their positions relative to the scene recording device includes at least one algorithmic technique including graph cut image segmentation, edge detection, pose consistency, pose clustering, scale-invariant feature transform (SIFT), speeded up robust features (SURF), and/or simple interactive object extraction (SIOX). The processor can be used to perform all of the steps of the method of the present invention automatically.

In summary, the method of the present invention automatically generates a hardcopy photo product with a visual annotated graphic legend to provide additional information related to the printed image without obscuring the printed image.

DETAILED DESCRIPTION OF THE INVENTION

The present invention is particularly useful when used with images recorded at formal gatherings featuring large numbers of individuals, such as academic class pictures or group photographs of members of business, social organizations, and sports teams. In these situations, individuals tend to be posed in rows facing the recording device and may feature hundreds of individuals, making 'in scene' printed information, annotation, keys, and legends impractical. The invention is also useful for photographs recorded at informal gatherings, where individuals tend to have more casual poses or is depicted engaged in activities such as recreation, parties, picnics, reunions, and sporting events. The photographic prints produced from these events often have commemorative value to the participants and others associated with the individuals or organizations. These hardcopy photo products can take the form of prints, multi-image prints, duplex prints, panoramic prints, a print with a transparent overlay, framed photographs, photo books, photo book pages, brochures, yearbooks, class pictures, annual reports, posters, greeting cards, post card, wedding albums, and so forth.

Figure 1:
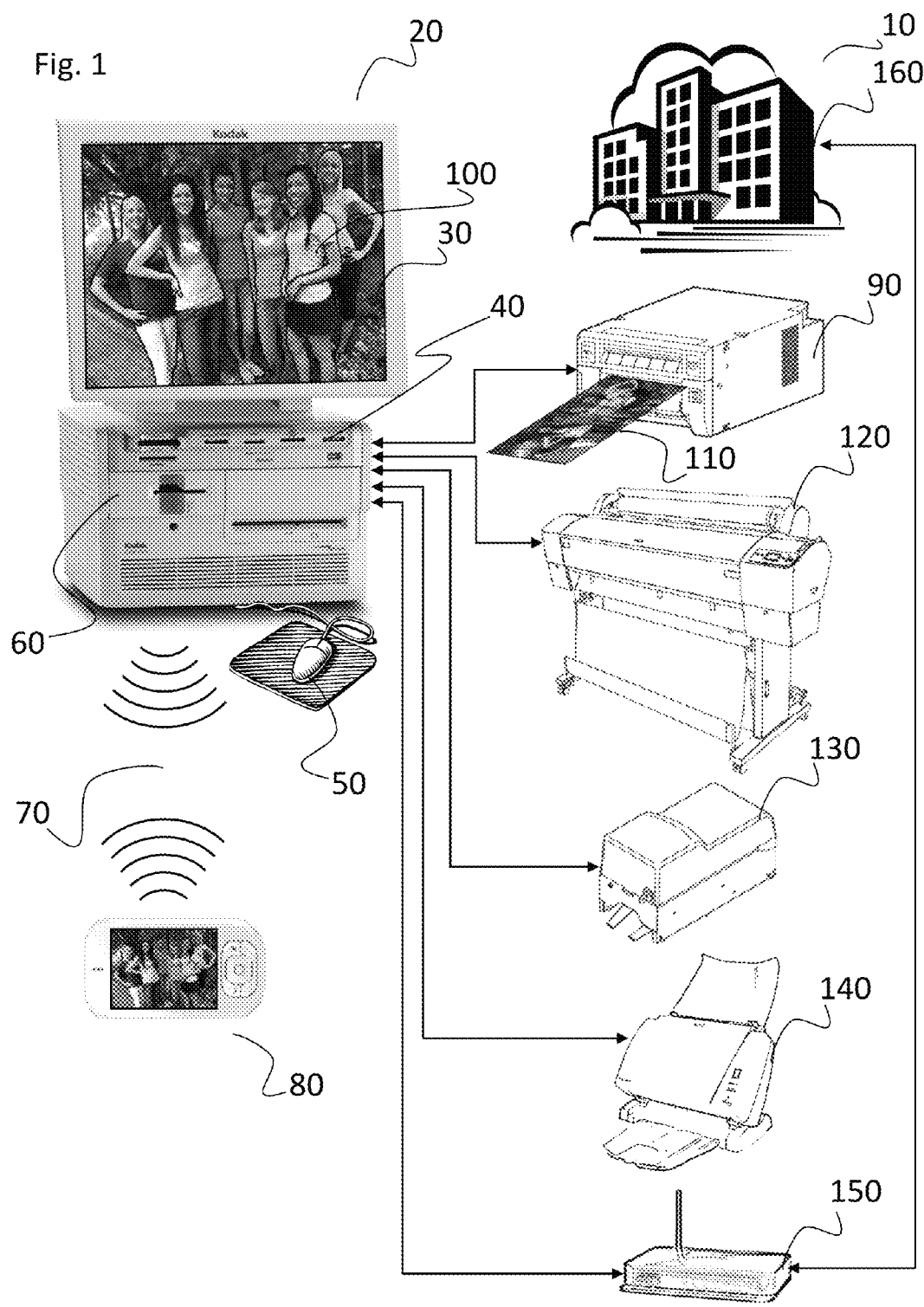
FIG. 1 is a graphic illustration showing an image processing system suitable for practicing the image processing method according to the present invention.

FIG. 1 shows a graphic illustration of an image processing system suitable for practicing the image processing method and photo product production according to the present invention. The system may be embodied in a conventional personal computer, at a self-service imaging kiosk, on a touch tablet, or smart phone. The image processing required may be performed on the computational device directly or via remote processor connected to the local device by a communication network. In addition, the resulting hardcopy image product may be produced locally or at a remote location. Imaging System 10 includes, Imaging Kiosk 20 which is typically setup at retail locations for users to create and order an array of photo products using digital images provided the user. Imaging Kiosk 20 includes; Touch Screen Display 30 providing a Graphic User Interface (GUI) based user interaction, Media Read/Write Port Array 40 for interfacing various forms of physical digital media, such as various formats of memory cards, USB flash drives, and for a wired connection to transfer images from mobile device 80.

Illustrated on Touch Screen Display 30 is Group Scene Image 100 provided in this example by the user's Wireless Mobile Device 80 via Wireless Interaction 70. Pointing Device 50 includes any suitable device that provides user interaction including; a computer mouse, track pad, drawing device and stylus, or camera, microphone, and speaker combinations for gesture and voice control. Also, included in imaging system 10 is optional Transaction Card Reader 60, to enable payment at retail venues and/or for use with customer loyalty cards to track customer usage and to provide promotional incentives.

Imaging system 10 includes Wireless Interaction 70 for use with the user's Wireless Mobile Device 80, and includes one or more wireless communication techniques such as Bluetooth, WIFI, WIFI-Direct, and Near Field Communications (NFC) that allow the user to communicate with the Imaging System 10 and to transfer images from their mobile device 80, or via their device in the case of images stored at a remote location, to Imaging Kiosk 20. Additional devices for obtaining digital images provided by the user include CD/DVD Reader/Writer 130 for still and motion images stored on disks and Hard Copy Scanner 140 for images on prints or negative and transparency films. Examples of Hard Copy 140 scanner include reflection and transparency scanners with manual platens to digitize hardcopy media, an automatic document feeder, and/or film strip and/or slide transport. The output devices for producing photo products include; Duplex Color Printer 90 which includes Thermal dye-sublimation, electro-photographic, inkjet, and/or Color Photo Paper printer/processor type printers shown producing Group Scene Print 110. In addition, for printing large images for wall art, framing, or photo posters, Large Format Color Printer 120 is provided. Wireless Router 150 provides network access to Imaging system 10 and its components. Remote Production Facility 160 is used to produce custom photo products, not suitable for production at all retail venues, and include products such as photo mugs, photo apparel, and high quality bound photo books.

Figure 2A:
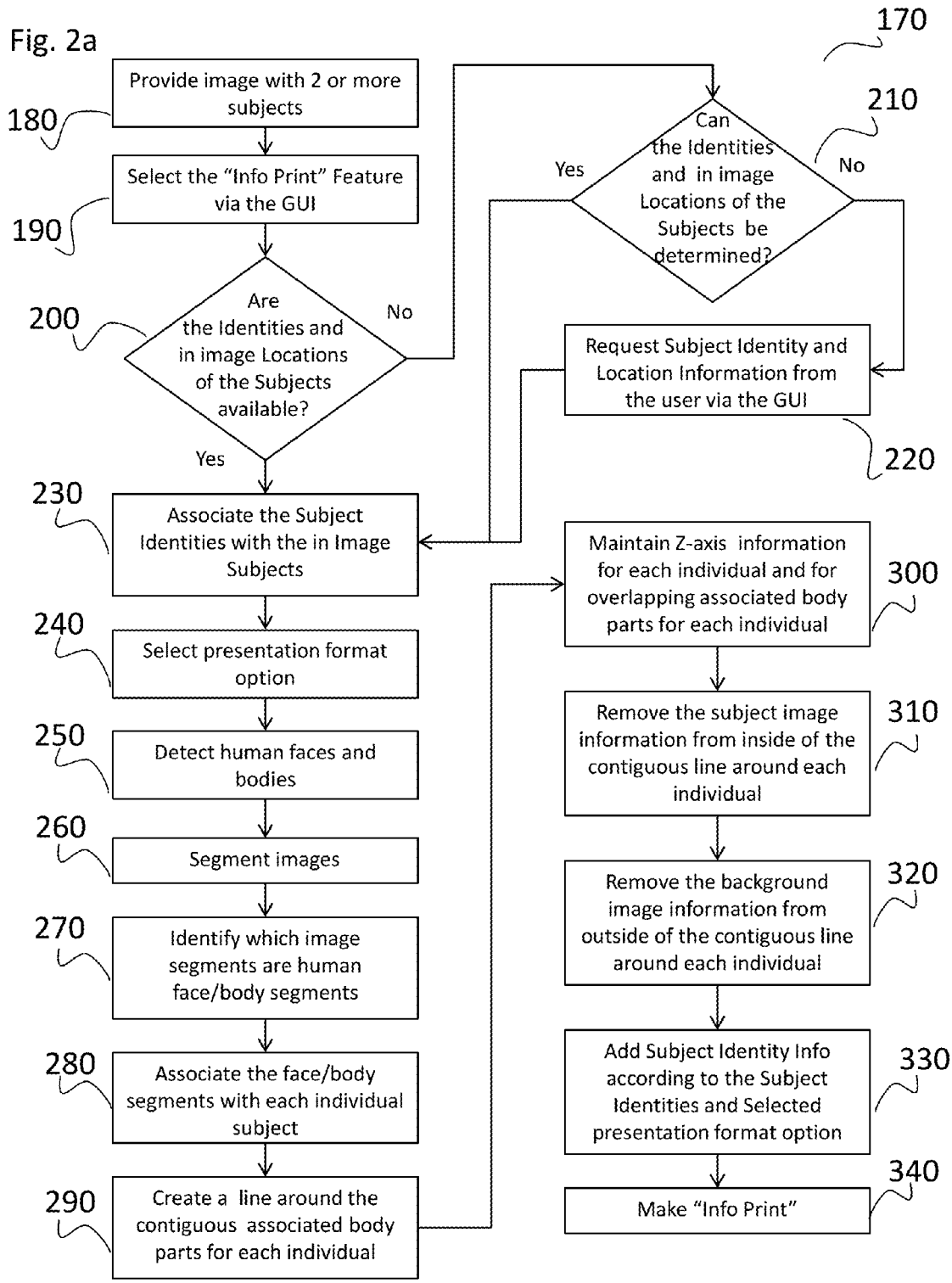
FIG. 2a is a flow chart showing one embodiment of the image processing method according to the present invention.

Referring to FIG. 2a is a flow chart showing one embodiment of the image processing method according to the present invention. The identification of the individuals within the scene is obtained from facial recognition, metadata related to the recorded scene image, from a user operating a user input device and/or from image metadata information relating to subject identification and subject placement within a scene provided by a social network system, such as Facebook, Google+, and/or as recorded by mobile device operating systems such as Android. Incorporated herein by reference are U.S. Pat. No. 7,324,693 METHOD OF HUMAN FIGURE CONTOUR OUTLINING IN IMAGES, U.S. Pat. No. 8,280,164 PRODUCING OBJECT CUTOUTS IN TOPICALLY RELATED IMAGES, "Stationary Features and Cat Detection", Journal of Machine Learning Research—Francois Fleuret and Donald Geman, U.S. Pat. No. 6,697,502 IMAGE PROCESSING METHOD FOR DETECTING HUMAN FIGURES IN A DIGITAL IMAGE.

Alternative approaches to identifying and extracting subjects in a scene include using the well-known chroma-key capture system to automatically isolate the foreground subjects from the background scene. In addition to so called "blue screen" or "green screen" chroma-key systems, techniques described U.S. Pat. No. 5,914,748 METHOD AND APPARATUS FOR GENERATING A COMPOSITE IMAGE USING THE DIFFERENCE OF TWO IMAGES incorporated herein by reference, include recording two images of the scene one with the foreground subjects in position and one without the foreground subjects present in the scene. The two images are digitally processed to create a pseudo-chroma-key effect allowing the foreground subjects to be isolated from the background.

FIG. 2a depicts system flowchart 170 which can be practiced on a photo kiosk, mobile phone, tablet, or personal computer. In step 180 a user provides a digital image which preferably contains two or more individuals and can originate from a digital camera, phone, tablet, a scan of hard copy print or film, or stills images extracted from video. In step 190 the user selects Info Print Feature by using a Graphic User Interface and touch screen, pointing device, voice command, or any other well-known computer/user interaction technique, not shown. Next in decision Step 200 the system interrogates the metadata associated with the digital image provided in step 180 to determine if the identities and locations for the individuals depicted in the digital image scene are known. The associated metadata related to the identities and locations within the scene of the depicted individuals can be obtained from the digital image file, in a metadata database associated with the digital image, from operating system such as Android, and/or from a social network with a digital image capability. If at decision Step 200 the identities and locations of the depicted individuals are known, the process continues to step 230 where the identities are associated with the subjects depicted in the digital image in the scene. If at decision Step 200 the identities and locations of the depicted individuals are not known the process continues at decision Step 210 where the system determines if the identities and locations of the depicted individuals can be determined. The system uses face identification techniques to determine the relative positions of the depicted individuals and face recognition techniques to identify the depicted individuals. If at decision Step 210, the system fails to determine any or all the identities and locations of the depicted individuals in group scene Image 100 the process continues to graphic user interface step 220 where the imaging kiosk 20 requests identities and locations of the subjects depicted on touch screen display 30 from the user. The user would then use touch screen display 30 and/or pointing device 50 to provide the requested information to imaging kiosk 20. The user provided identities and locations of the individuals in group scene image 100 depicted on touch screen 30 are then stored in association with the user provided digital image at Step 230.

Now that the identities and locations of the subjects in group scene image 100 are stored in association with the user provided digital image the user selects the presentation format at Step 240 for the hardcopy photo product to be created. The various presentation formats for the hardcopy photo products all provide the identity information and a visual reference relative to the original scene. The annotated visual reference may be printed on the same side of the same media and adjacent to the original scene, on the back side of the same media as the original scene, in the same or difference scale, on a separate conventional or transparent media used in conjunction with the original scene print, on a multiple image viewing print media incorporating a barrier or lenticular overlay, or on a duplex translucent media with scene image on one side and an aligned and reverse printed annotated visual scene derived reference on the other side of the translucent media. The details of the presentation formats of the hardcopy photo products will be discussed in detail later.

Figure 2B:
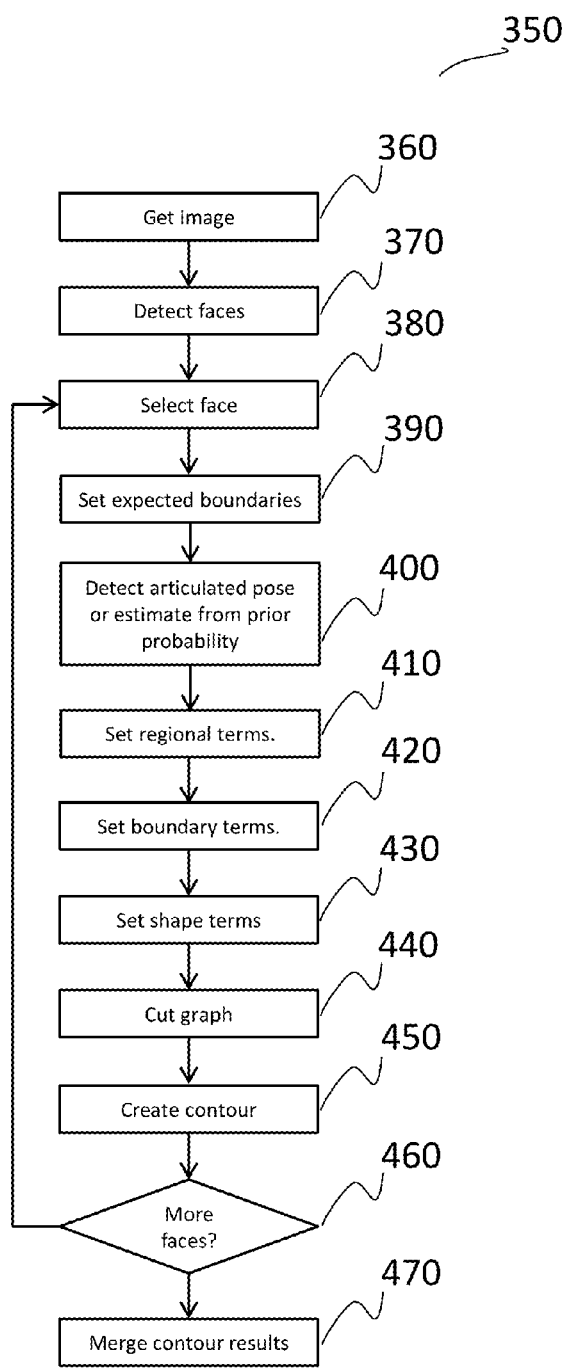
FIG. 2b is a flow chart showing the image process method for creating the outlines around the identified subjects.

At Step 250, human faces and bodies are detected, the details of which will be addressed in the descriptions of FIG. 2b. Once the faces and bodies are detected the image is segmented in Step 260 and in Step 270, the human face and body segments are identified. In Step 280 the identified segments are associated with each individual subject in the scene. A contiguous line is created around the human face and body segments associated with each individual subject in Step 290. The digitally created line can be produced in any color to contrast with the scene or subject image and can have a fixed or variable width that can be selected by the user or be calculated to scale to selected presentation format, photo product type, image size, and/or image resolution. In addition, the lines created around the individual subjects can be continuous, hashed, dotted and so forth and individual line types, widths, and colors can also be selected for each individual subject depicted in the scene. Furthermore, when individual line types are used to depict different individuals, the line types can also be referenced in the visual legend. At Step 300 the Z-axis depth information between the various individuals in the scene is maintained so that outlined portions of the individuals appear to overlap according to their original positions relative to the scene image capture device. This is particularly useful for large group scenes with two or more rows of individuals. More details of this process will be provided with the description of FIG. 2c. In addition, if subject position and depth information has been recorded as metadata, it can be used to assist and/or verify the Z-axis determination of the individuals within the scene.

At Step 310, to further create the outline image, the subject image information from inside of the contiguous lines around each individual is removed and Step 320 the background image information outside of the contiguous lines is removed, leaving only the contiguous lines. Turning now to Step 330, the subject identity information is added according to the appropriate subject positions, identities, and selected presentation format. Positioning and formatting the subject identity information, outline image, and the original scene image is accomplished by either fixed or dynamic templates that are selected or modified according to the selected presentation format. Once the positioning of the individual components and the formatting is completed, at Step 340 the info print is produced on a hard copy printer compatible with selected presentation, or alternatively the formatted image file can be stored or transmitted for fulfillment at a later time. The formatted image file can be transmitted to a local retailer for in store printing and pick up by the customer or a designated recipient.

Turning now to FIG. 2b, an outline flow chart 350 showing the image process method for creating the silhouette outlines around the identified subjects. To produce the outlines of the subjects found within the picture, object segmentation is employed. Those skilled in the art will readily recognize that there are many methods of object segmentation. Often these methods require prior knowledge of the object to be segmented, assistance from a user, or a combination of both.

Graph cut methods have become popular for optimizing the location of a contour. Graph cut methods are able to find a global optimum for binary labeling (i.e., two labels) problems, such as foreground/background image segmentation. One popular method was described by Y. Boykov and M-P. Jolly in, "Interactive Graph Cuts for Optimal Boundary & Region Segmentation of Objects in N-D Images" Proceedings of "International Conference on Computer Vision", Vancouver, Canada, July 2001 Volume I, p. 105. Several variations to this method are described by F. Yi and I. Moon in "Image Segmentation: A Survey of Graph-cut Methods," 2012 International Conference on Systems and Informatics (ICSAI 2012), Yantai China. These papers are incorporated herein by reference.

Boykov and Jolly introduce an interactive method of graph-cut segmentation in which the user sets hard constraints (often referred to as "seeds") which declare some pixels of the image to depict foreground subject matter and others to depict background. These hard constraints are typically very small subsets of the foreground and background pixels respectively. A graph cutting algorithm is employed to find an optimal contour which separates foreground from background. Several variations of this algorithm use assumptions about the spatial distribution of the subject to minimize or eliminate the dependency on the user. For example, some methods assume that pixels contacting or near the edge of the image will not depict foreground matter and that the subject will be centrally located. For the present invention, face detection can be employed to further refine the location of foreground seeds. Pixels from the head region as well as pixels from the mid-chest region may be used a foreground seeds.

Yi and Moon also describe graph-cut extensions which employ shape-based prior knowledge of the foreground subject to guide the determination of the optimal cut. Y. Yang and D. Ramanan, describe a method of estimating a human pose in "Articulated pose estimation with flexible mixtures-of-parts," Computer Vision and Pattern Recognition (CVPR), 2011 IEEE Conference on. IEEE, 2011. This paper is incorporated herein by reference. The method described by Yang and Ramanan can produce estimates of the location of body parts. These estimates are insufficient to produce contour outlines by themselves. Rather, they can be used to provide shape-based prior information as described by Yi and Moon, as well as providing good estimates of pixels which can be used as foreground seeds. In working with an image containing several people, the contour for each person is created independently in the preferred embodiment. In a second step, contours from different people are ordered from back to front and rendered into the final image.

In FIG. 2b, an image is provided to the system in get image Step 360. Faces are detected in detect faces Step 370. A face is selected select face Step 380. The set expected boundaries Step 390 are determined for the face. These boundaries are set such that given the head size, pose and location, the body of the person should be fully enclosed by the boundary. Optionally, the articulated pose of the body may be detected using the method described by Yang and Ramanan or other method to detect/estimate pose Step 400. If not, a prior probability estimate of body extent may be used. The outer boundary may be used to create the terms relating to background region, pixels with the highest probability of head and body are used to set the foreground regional terms in the set regional terms Step 410. The color difference between neighboring pixels is used to create boundary terms and set boundary terms in Step 420. Shape terms are created using the information from set shape terms Step 430. A segmentation is obtained using the graph-cut algorithm in cut graph Step 440. The contour is created from the boundary of the largest region of the results of the create contour Step 450. The process is repeated at the find more faces decision Step 460 for each face at the select face Step 380. Finally, each of the contours is merged in the merge contour results Step 470, which will be detailed below.

Figure 2C:
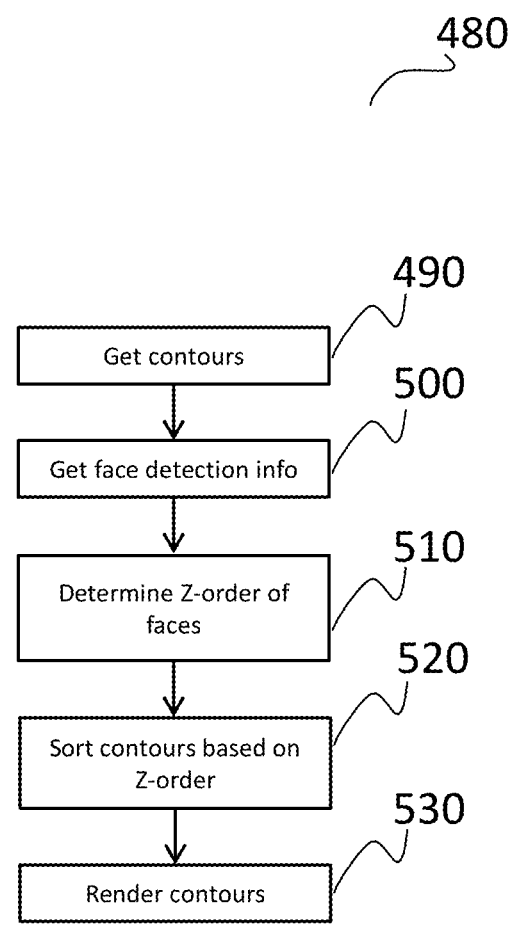
FIG. 2c is a flow chart showing the image process method for determining the Z-order positions for the outlines around the identified subjects.

FIG. 2c illustrates flow chart 480, the method of merging contours. The set of contours from an image are provided in Step 490. For each contour, the face detection information is provided Step 500. This information includes the detected face size, the detection location, the relative pose of the face and the estimated or actual age and gender of the person depicted. This information is used to estimate the relative distance from the camera of each subject in Step 510. This relative distance is referred to as Z-order. The set of contours are sorted by the Z-order determined in Step 520. Finally, the contours are combined by rendering them from farthest to nearest to the camera in the render contours Step 530.

Figure 3A:
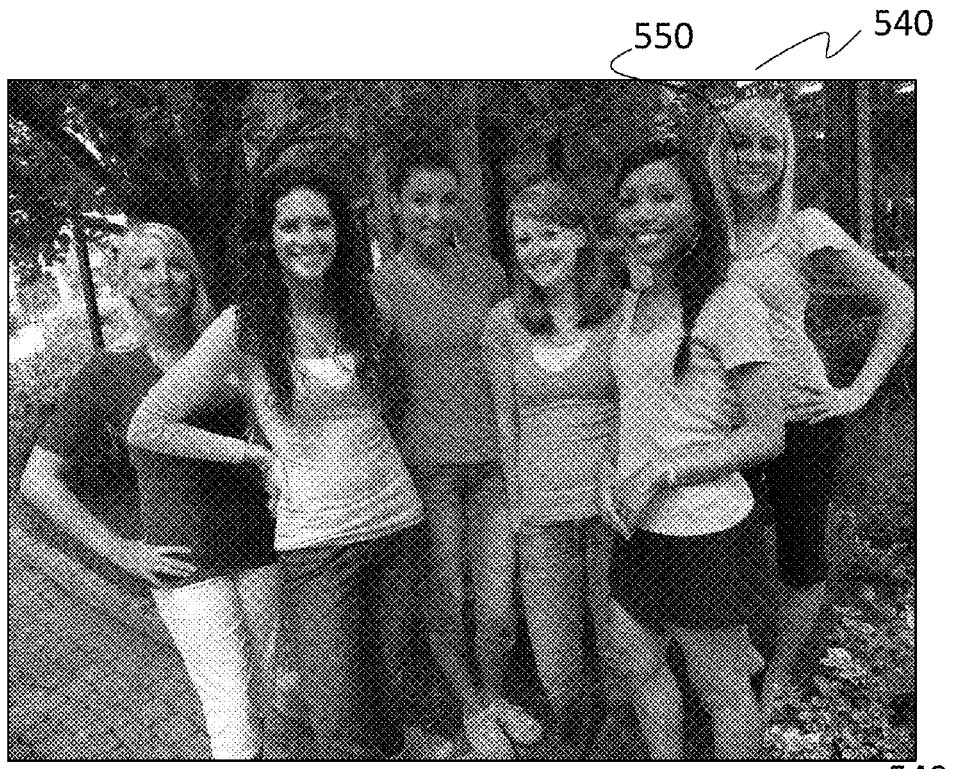
FIG. 3a is an illustration of a group scene showing six individuals.
Figure 3B:
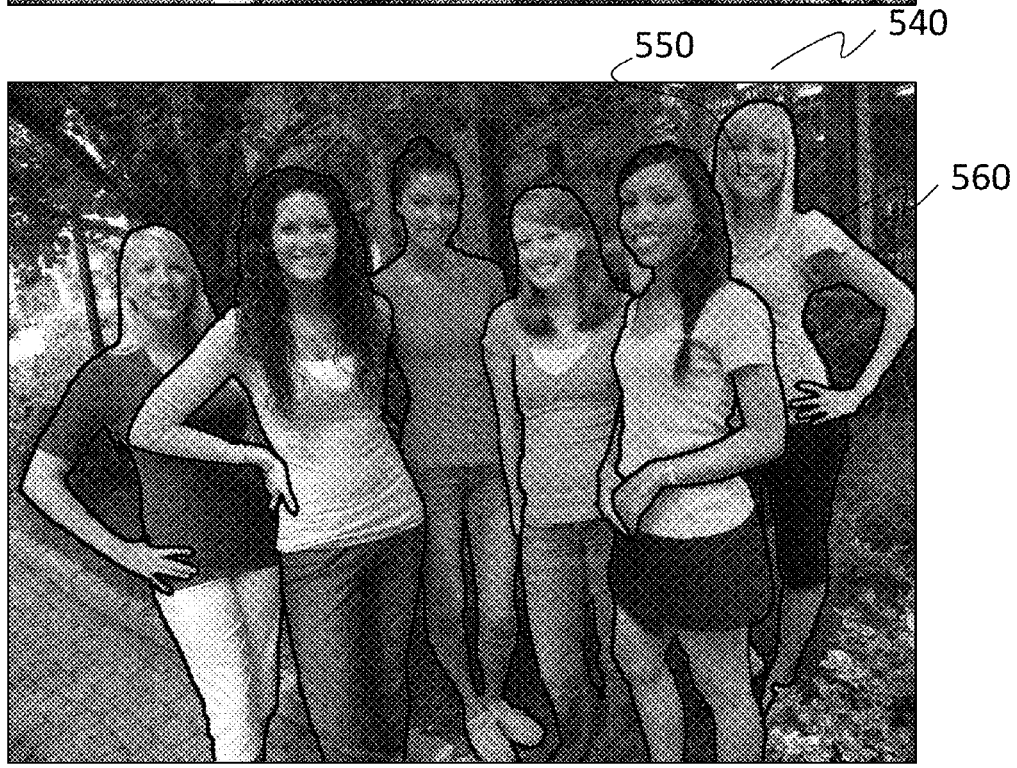
FIG. 3b is an illustration of a group scene showing six individuals with lines formed around the edges of each individual.
Figure 3C:
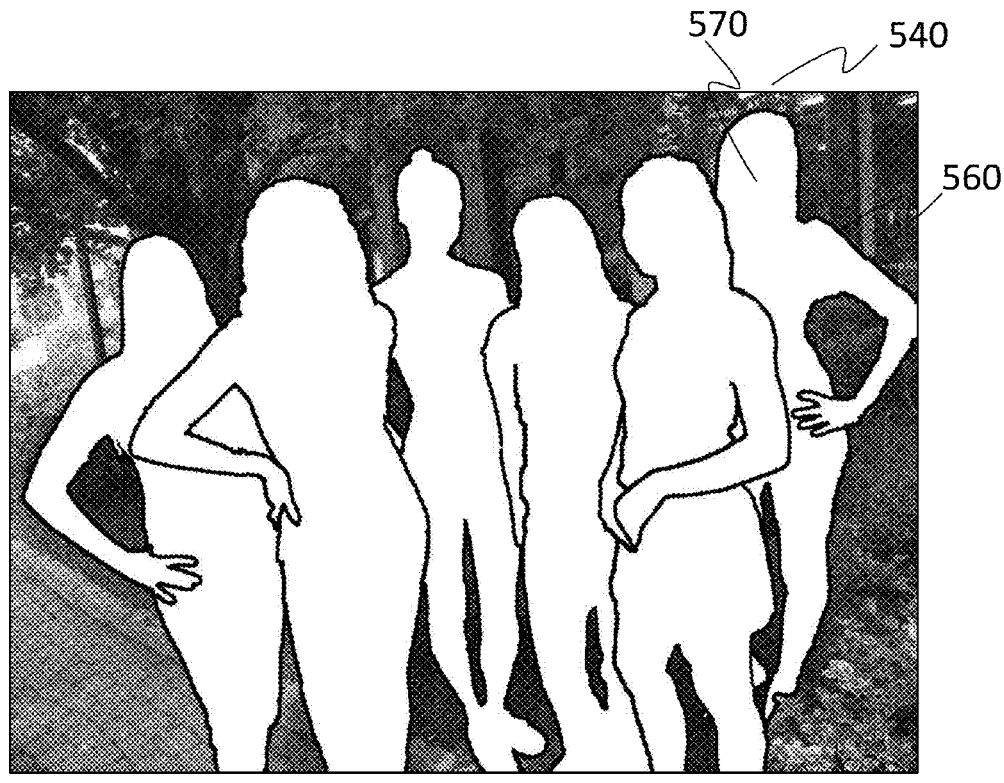
FIG. 3c is an illustration of a group scene showing six individuals with lines formed around the edges of each individual and the interior area of each individual removed.
Figure 3D:
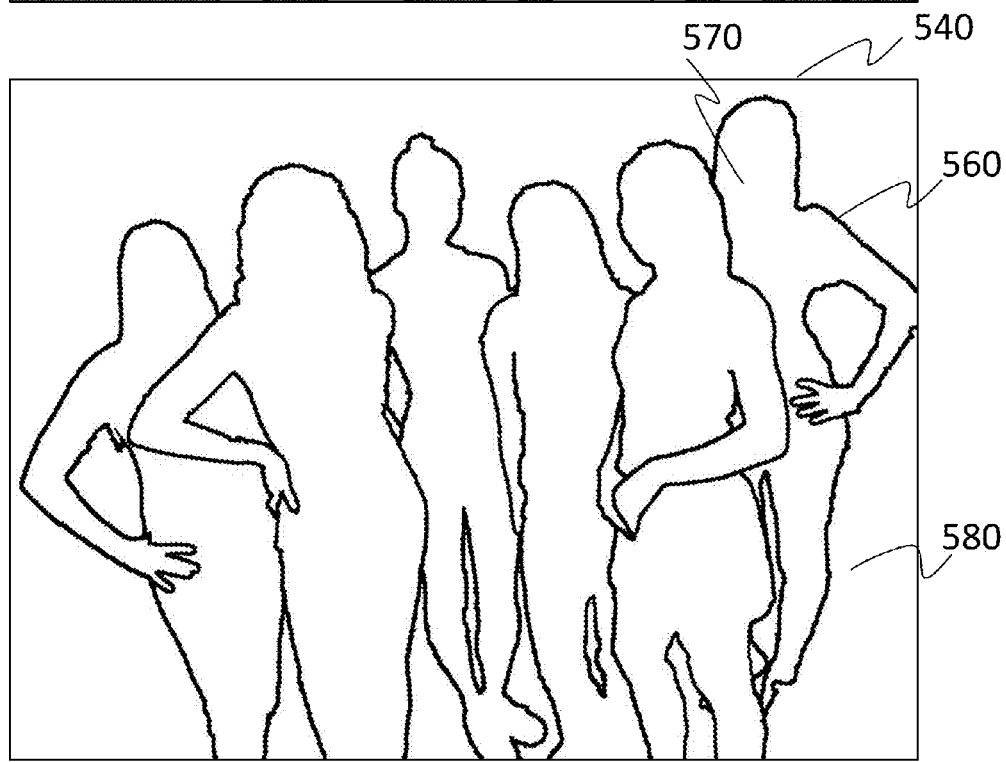
FIG. 3d is an illustration of a group scene showing six individuals with lines formed around the edges of each individual, the interior area of each individual removed, and the background of the scene removed.

Turning now to FIG. 3a, an illustration of a soft display of a group scene 540 including group of six individuals 550. The soft display group scene can be displayed on touch screen display 30, of imaging kiosk 20 and/or on the screen of mobile device 80. FIG. 3b illustrates the soft display of a group scene 540, including the group of six individuals 550, and with an outline constructed around each individual 560. In FIG. 3c the illustration of the soft display of a scene 540 including a group scene showing six individuals with an outline constructed around each individual 560, and the interior area of each individual of the group of six individuals is erased 570. FIG. 3d is an illustration of a soft display of a scene including a group of individuals 540, an outline constructed around each individual 560 of the group of six individuals which have been erased 570. In addition the soft copy display scene background has been erased 580, with the only image information remaining outline constructed around each individual 560. This technique provides an easy to comprehend graphic visual reference that is also useful if the printed photo product includes a transparent overlay with the legend information and outline graphic which can be used as needed providing a temporary, minimally obscuring visual reference. The scene derived individual subject outlines appear to be "stacked" relative to the subject's appearance in the original scene, with subjects in the foreground or front row appear on top of or in front of the subjects in the background or back row appear below or in back of the foreground subjects. This is done to preserve the physical context of the original scene by providing the Z-axis positions of the individuals relative to the position of the camera recording the original scene.

Figure 4A:
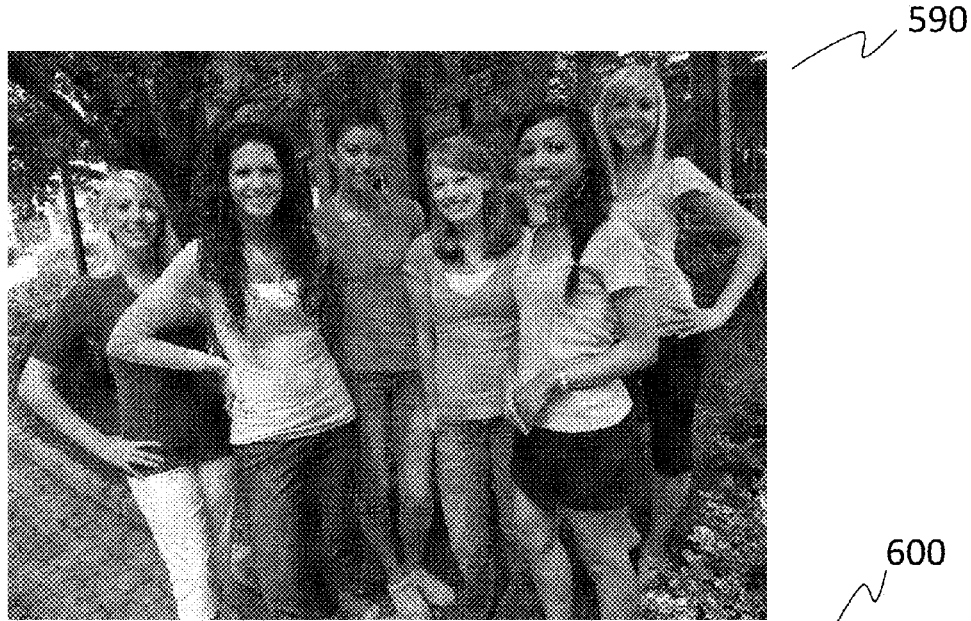
FIG. 4a is an illustration of a front surface of a duplex print depicting a group scene showing six individuals according to the present invention.
Figure 4B:
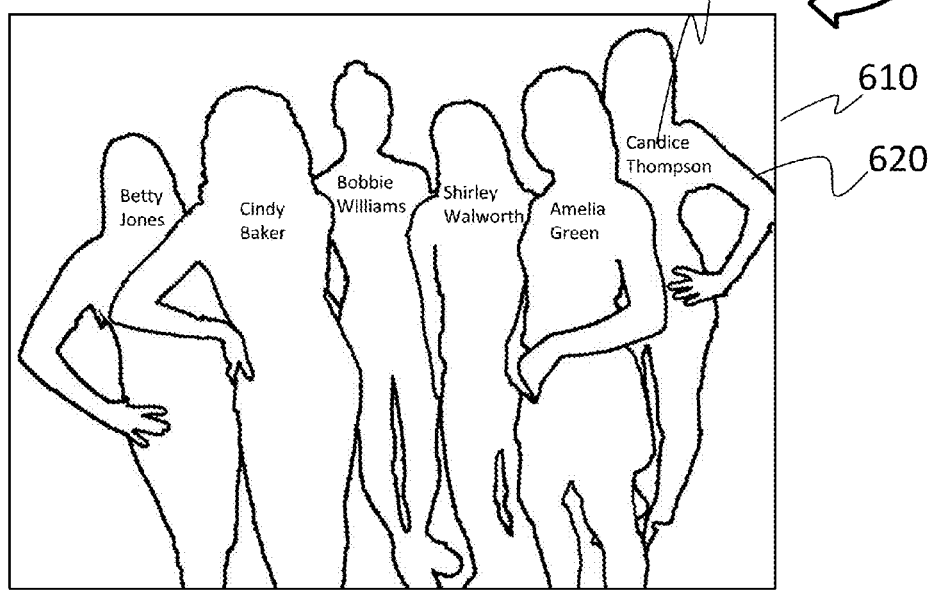
FIG. 4b is an illustration of a rear surface of a duplex print depicting a group scene showing six individuals in outline with annotations provided for each individual to provide information relevant to the front surface of the print according to the present invention.

FIG. 4a is an illustration of a front surface of a duplex print depicting a scene including a group of six individuals 590. Optionally, multiple images can be printed on the front surface of the page, as in a photobook, collage, or calendar prints. FIG. 4b illustrates the rear surface of the duplex print shown in FIG. 4a. Arrow symbol 600 indicates that the print has been turned over depicting the rear surface of a print of a scene including the outlines of a group of six individuals 610. In this embodiment, the group scene showing the outlines of a group of six individuals with textual annotations 630, such as "Candice Thompson" identifying each individual depicted. The rear surface of the print 610 is used to provide a visual reference to identity the individuals on the front surface of the print 590 according to the present invention. The rear surface of the print 610, as with the front surface 590 can include multiple visual legends, identifiers, or captions containing automatically generated outlines depending on the number of scene images are depicted on the front surface.

Figure 5:
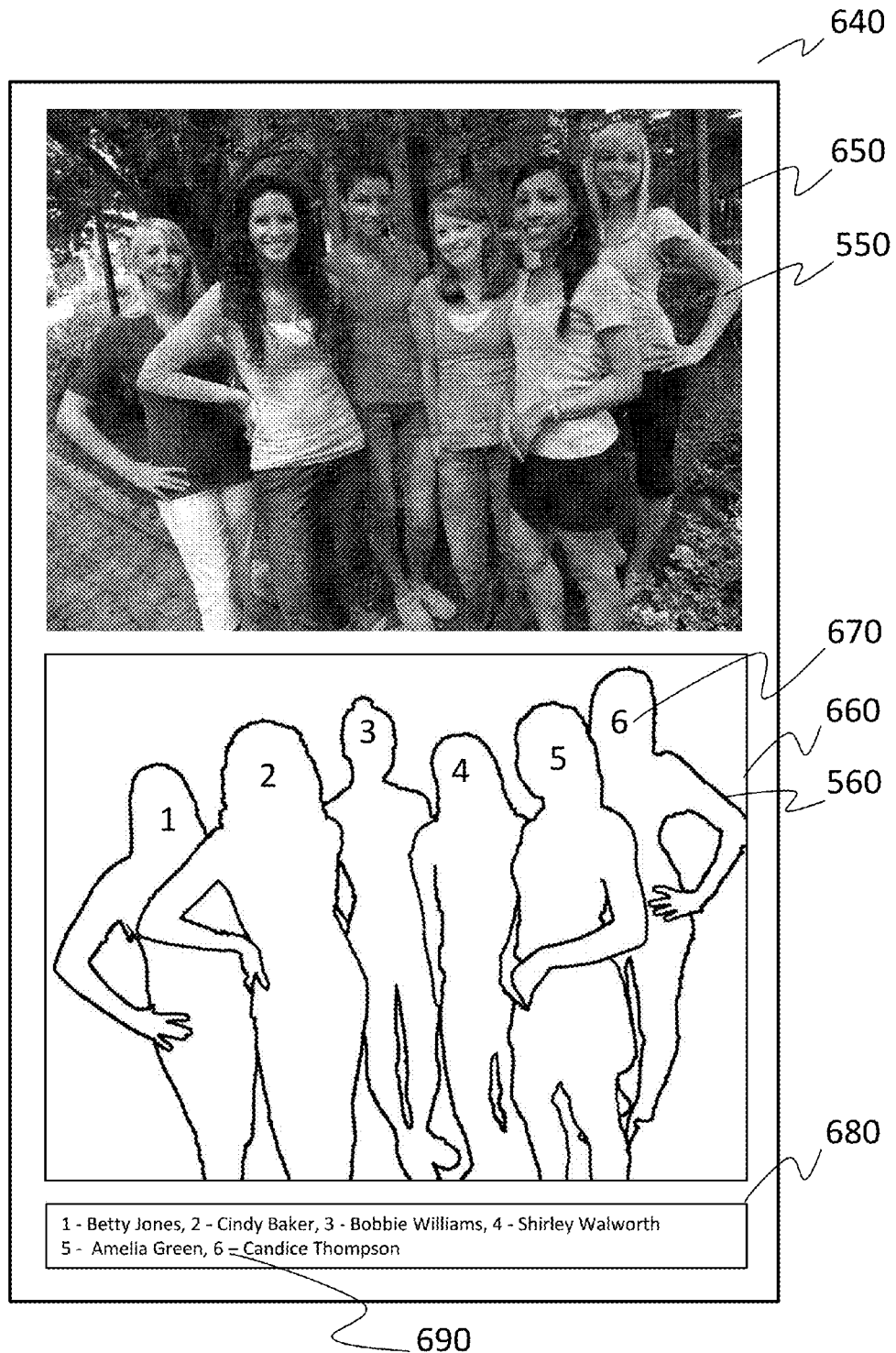
FIG. 5 is an illustration of the front surface of a print depicting a group scene showing six individuals in one area, an illustration depicting the same group scene showing six individuals in outline each with an alpha numeric indicator in a second area, and a legend providing identification information relative to the alpha numeric indicators in a third area.

FIG. 5 is an illustration that depicts an alternative embodiment of the present invention. Hardcopy print 640 is produced on either a duplex or single sided printer, since in this particular embodiment only the front surface for the hardcopy print contains images and graphic indicators. Hardcopy print 640 includes a section 650 of the front surface of the print that includes a scene of a group of six individuals 550. An illustration depicting the same group scene showing six individuals in outline 560 is in another section 660 of the front surface of the print 640. Included with the each of the outlines of a group of six individuals 560 is an alpha numeric indicator of the identity of each one of the individuals 670. In a third section of the front surface of the print 640 is a legend including the keys and identities of the individuals 680. Legend 680 includes a key matching each of the alpha numeric indicators 670 and information indicating the identity of the individuals 690 depicted in outline 560.

Figure 6A:
FIG. 6a is an illustration of a conventional print of a group scene showing six individuals.
Figure 6B:
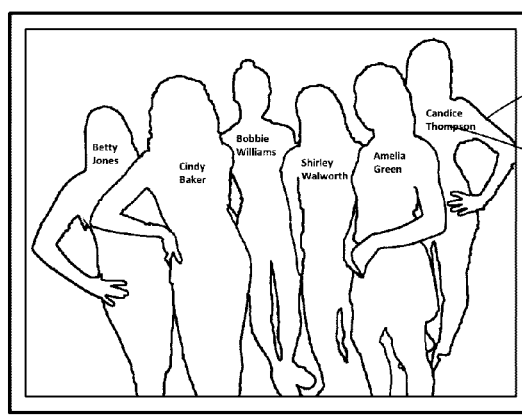
FIG. 6b is an illustration of a transparency print depicting the same group scene showing six individuals in outline each with identification label within the outlines of each individual.
Figure 6C:
FIG. 6c is an illustration of a transparency print aligned and overlaying the conventional print of a group scene showing six individuals.

FIG. 6a is an illustration of the front surface of a print conventional hardcopy print of a group scene including a group of six individuals 590. FIG. 6b is an illustration of a transparency print 700 of a scene including the outlines of a group of six individuals 620. Each group of six individuals includes identification label 630 within the outlines of each individual. FIG. 6c is an illustration of a transparency print 700 aligned and overlaying the conventional print 710 of a group scene showing six individuals 590. In this embodiment, the user can place the transparency print 700 over the conventional print as need to identify the subjects depicted in the scene.

Figure 7:
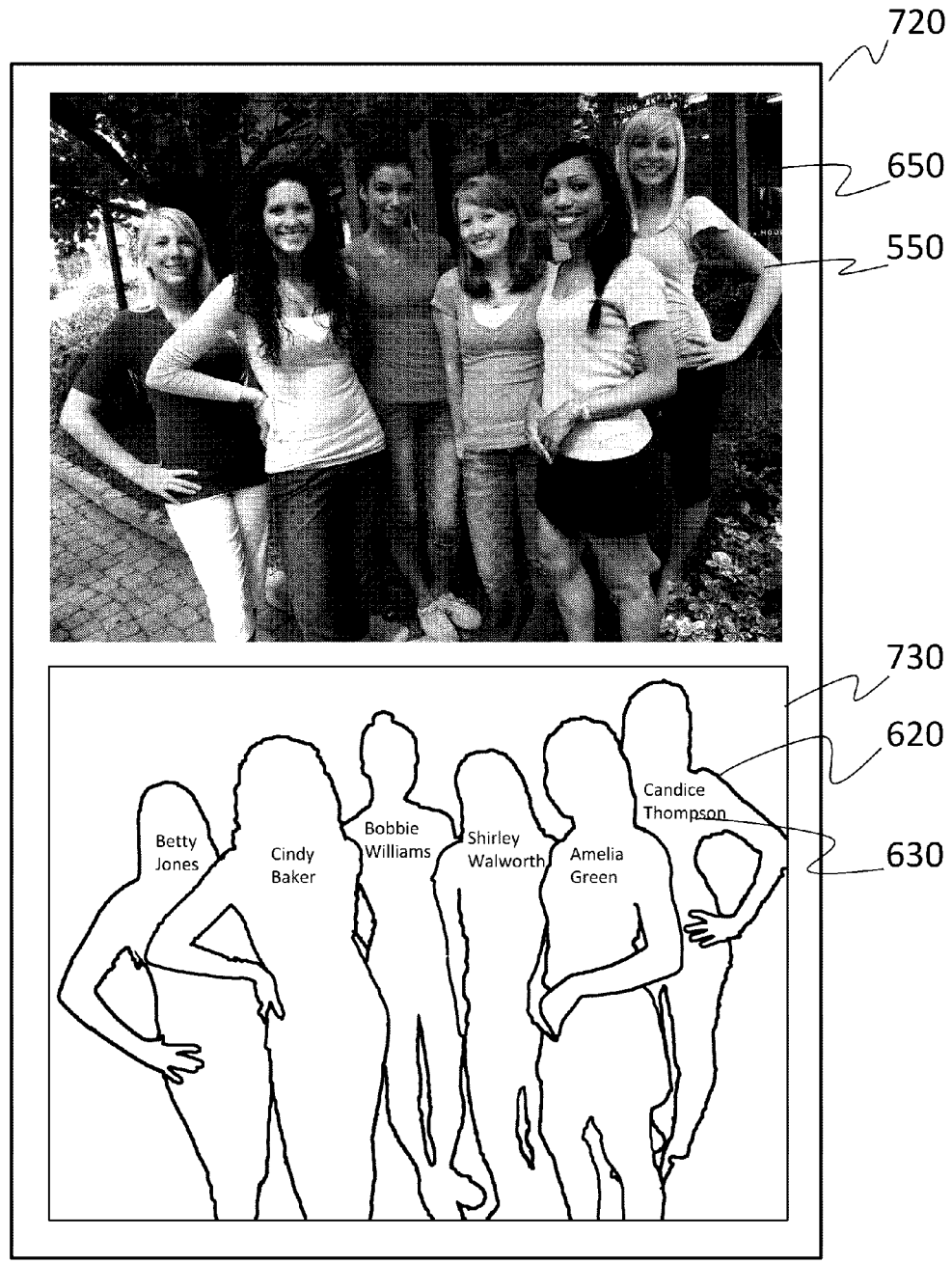
FIG. 7 is an illustration of a conventional print of a group scene showing six individuals with an adjacent annotated outline printed on the same media.

FIG. 7 is an illustration of the front surface conventional print 720. A section on the front surface 650 of the print 720 includes scene a group of six individuals 550. Adjacent to section 650 is a second section 730 including an annotated outline printed on the same surface of the same media. The section 730 of the print includes the outlines of the group of six individuals 620, and within each outline there is an annotation identifying and individual 630. This alternative embodiment is suitable for hardcopy output and/or the printed image is large enough to accommodate the annotation information within the individual outlines.

Figure 8:
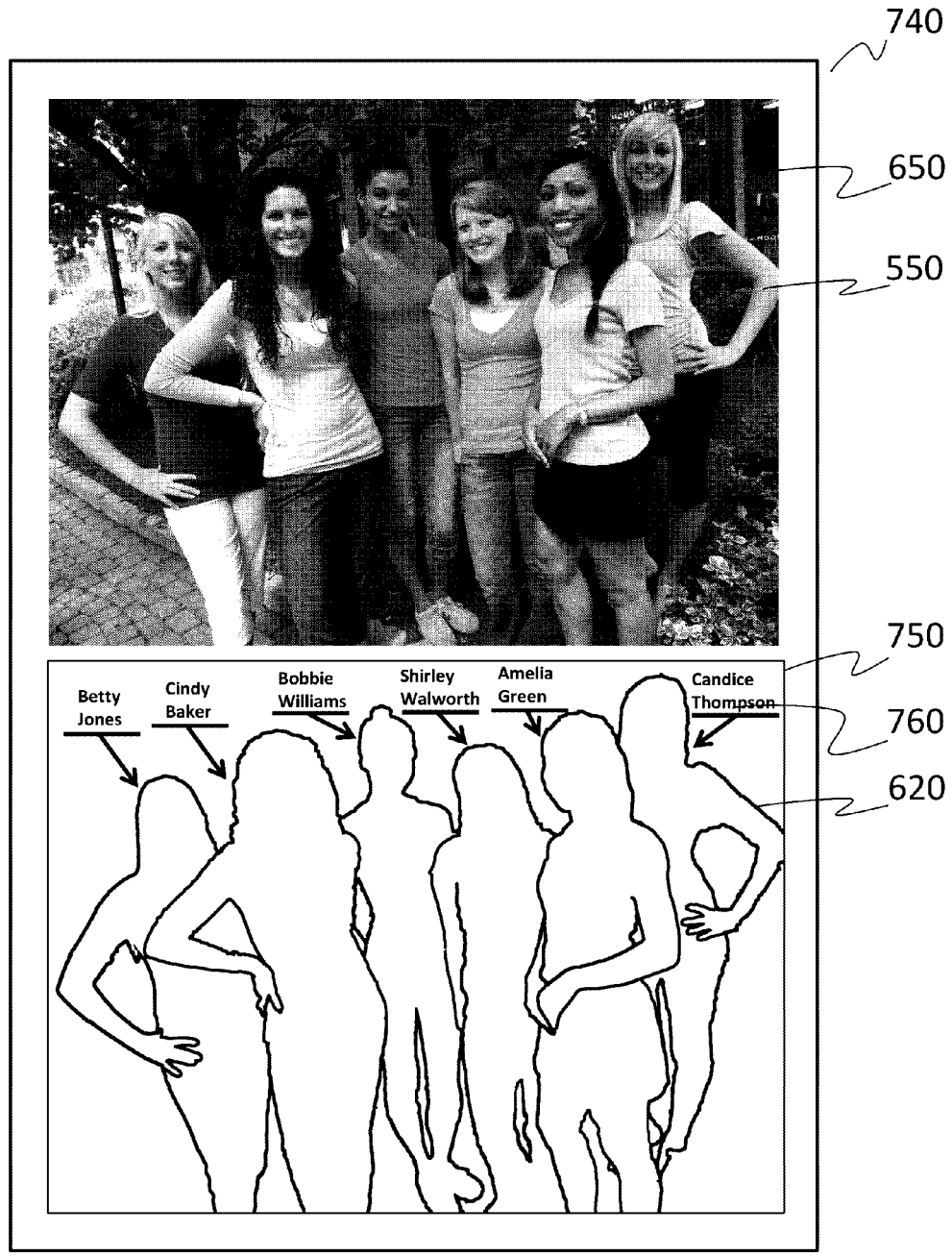
FIG. 8 is an illustration of a conventional print of a group scene showing six individuals with an alternative adjacent annotated outline printed on the same media.

FIG. 8 is an illustration of the front surface conventional print 740. A section on the front surface 650 of the print 740 includes scene a group of six individuals 550. Adjacent to section 650 is a second section 750 including an outline 620 printed on the same surface of the same media. The section 750 of the print includes the outlines of the group of six individuals 620 and external to each outline there is an annotation with a directional indicator identifying an individual 760. This alternative embodiment is suitable for hardcopy output and/or the printed image has empty background space large enough to accommodate the annotation information outside of the individual outlines.

Figure 9:
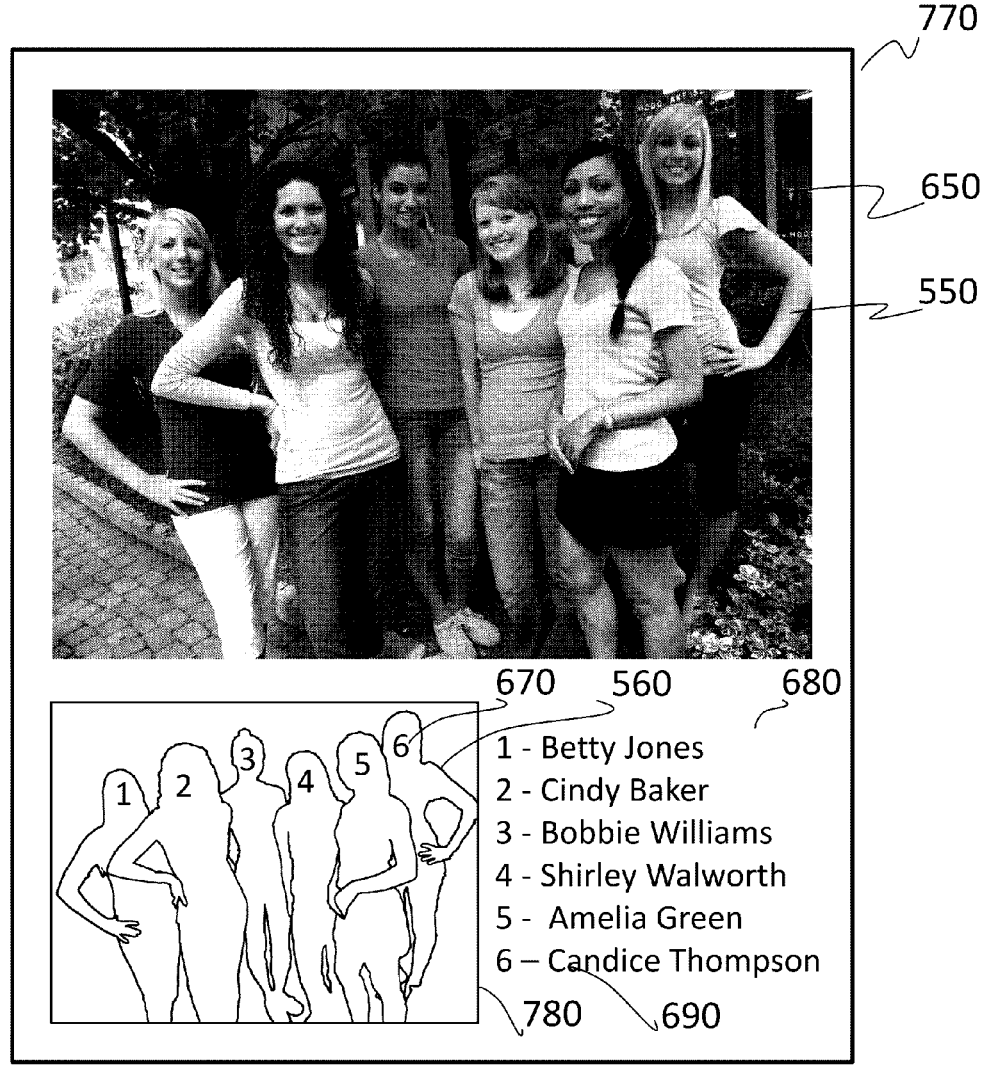
FIG. 9 is an illustration of a conventional print of a group scene showing six individuals with a reduced scale adjacent annotated outline incorporating a legend and key printed on the same media.

FIG. 9 is an illustration of the front surface of a conventional print 770, including a section of the print 650 including scene a group of six individuals 550. A second section 780 includes a reduced scale outline of the group of six individuals 560. In addition, within each outline is an alpha numeric indicator 670 for use in conjunction with legend 680 located on a third section of the front surface of print 770. In a 680 adjacent to the reduced scale outline 560 of the front surface of conventional print 770 includes a legend that provides the keys corresponding to the alpha numeric indicator 670 and identities 690 of the individuals 560 depicted in section 650. Section 780 is shown in reduced scale, but may be provided in a different reduced or optionally enlarged scale depending on the hardcopy print size, format, or scene content.

Figure 10A:
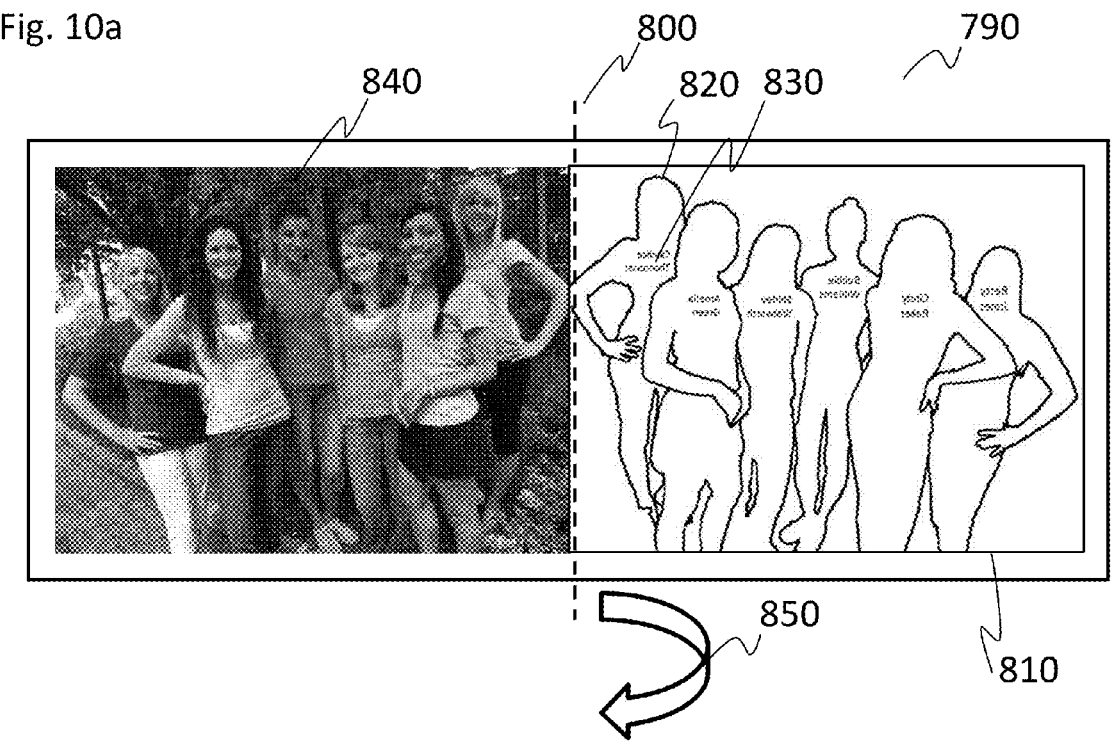
FIG. 10a is an illustration of a conventional print of a group scene showing six individuals with an adjacent annotated outline reverse printed on a section of transparency media including a fold line in the "open position".

FIG. 10a is an illustration of a hardcopy print 790 with a conventionally printed reflective portion 840 and reverse printed transparent portion 810 shown in the "open position". Included in the illustration is a symbol indicating a fold line 800 between the reflective print portion of a print media and the transparent portion of the print media. There are several approaches to providing a hardcopy print with a reflective and transparent portion, including; using a transparent media used in conjunction with a printer capable of printing a white reflective base layer on a portion of a transparent media or using a pre or post printing method of assembling a reflective and transparent media into a singular media piece. Additionally, sheet or roll transparent media can be pre-treated with a reflective, preferably white, printable surface on a portion approximating half of the surface of the sheet or roll transparency media. The printable surface can be applied by printing, coating, or lamination and configured to be compatible with the intended printing technique. These pre-assembled conventional print and transparency media sheets or rolls can be used with any suitable digital inkjet, dye sublimation, electrophotographic, and or AgX printer. The transparency media can be either bound into the book assembly or provided as an insert such as a book mark. Post printing assembly using suitable pressure sensitive, thermal, or chemical adhesives or mechanical binding techniques and assemblies such as staples, stitching, clips or the like. Alternatively, a transparency media alone can be used in conjunction with a printer capable of printing a reflective base layer, such as white, to a portion of the transparent media to produce a reflective print portion.

The left side reflective portion 840 of print 790 includes the group scene of six individuals and on the right side the transparency section 810 includes a reverse printed annotated outline of the group of six individuals 820 and reverse printed annotations of the group of six individuals 830. Portions 840 and 810 are separated by fold line 800 illustrated by a dashed line. In addition, Symbol 850 indicates direction in which the print 790 is intended to be folded at the fold line 800.

Alternative embodiments of applications this technique include opposite pages in a book, pamphlet, or card with the scene image on one side and the transparency media reverse printed annotated outline printed on the adjacent page. The transparency can be attached to an edge of the conventional print image and folded into the overlay position when required or can be unattached and of the same relative size and format and placed over the conventional image as needed. In addition, the two portions, 810 and 840 of print 790 can be bound with a permanent or temporary adhesive or mechanical clips that can be removed.

Figure 10B:
FIG. 10b is an illustration of a conventional print of a group scene showing six individuals with an adjacent annotated outline reverse printed on a section of transparency media including a fold line in the "closed position" which overlays the conventional print section.

FIG. 10b is an illustration of a print 790 of a group scene showing six individuals 840 with an adjacent annotated outline reverse printed on a section of transparency media 810 and the fold operation shown by indicator 850 along fold line 800 to place print 790 into the "closed position" 860. In closed position 860, group scene reflective print 840 is now overlaid by transparency portion 810 of print 790 and the of the reverse printed annotated outline, no longer appears to be reverse printed and aligns with the reflective print group scene 840.

Figure 11A:
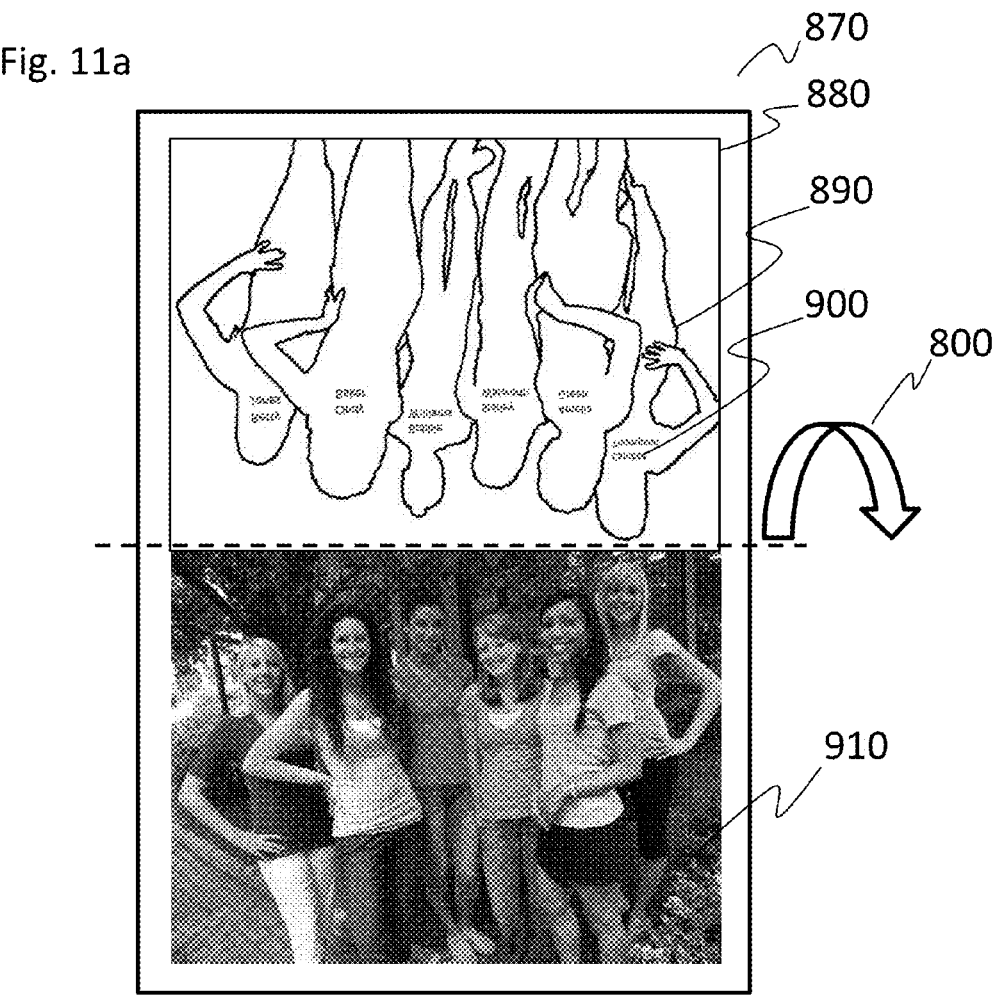
FIG. 11a is an illustration of a conventional print of a group scene showing six individuals with an alternative format adjacent annotated outline reverse printed on a section of transparency media including a fold line in the "open position".

FIG. 11a is an illustration of an alternative to the embodiment shown in FIG. 10a and FIG. 10b including similar materials and techniques. A print of a scene including the group of six individuals on the bottom of a reflective print portion 910 of a print media 870 and a reverse printed and inverted annotated outlines of the group of six individuals 880 on the top of a transparent portion of the print media 870. The reverse printed and inverted annotated outlines of the group of six individuals 890 includes reverse printed and inverted annotations of the group of six individuals 900. A symbol indicating a horizontal fold line and direction 800 to fold print media 870 from the "open position" shown in FIG. 11a to the "closed position" shown in FIG. 11b.

Figure 11B:
FIG. 11b is an illustration of a conventional print of a group scene showing six individuals with an alternative format adjacent annotated outline reverse printed on a section of transparency media including a fold line in the "closed position" which overlays the conventional print section.

FIG. 11b is an illustration the embodiment shown in FIG. 11a now in the "closed position" 920. The print 870 has been folded along the fold line and direction 800 shown in FIG. 11a. The transparent portion 880 is now aligned and overlaid on top of reflective print 910.

Figure 12A:
FIG. 12a is an illustration of group scene showing six individuals and annotated outline printed in a series of alternating horizontal lines including a lenticular or barrier overlay, in the first viewing position displaying the group scene.

FIG. 12a is an illustration of a multi-view print in the first viewing position 930 displaying the group scene showing six individuals 950 and incorporating a lenticular or barrier overlay 940. Not shown in FIG. 12a is that group scene 950 printed in a series of alternating horizontal lines with outline 890 and annotations 990, shown in FIG. 12B, overlaid with lenticular or barrier overlay 940. Multi-view prints are well known digital printing techniques used for producing sequence of stills images for "motion prints" or a set of individual images used "multi-view prints", each of which has the ability to display a different image as the print is viewed from a different angle. The technique requires a lenticular clear plastic cover sheet consisting of a series of horizontal lenticules or a barrier overlay layer of opaque material with a series of horizontal precision slits 940. Either of these overlays is used with a processed digital image that is created with interspersed alternating horizontal lines obtained from the original video sequence or set of still images. As the user holds the finished motion or multi-view print and tilts the print, as illustration by directional symbol 960, relative to her viewing angle, the image that appears changes showing a short motion clip or individual still images of the set of images. These techniques are described in detail in the U.S. Pat. No. 6,198,544 METHOD AND SYSTEM FOR CAPTURING IMAGES FROM A VIDEO TAPE FOR THE PURPOSE OF CREATING A MOTION CARD.

Figure 12B:
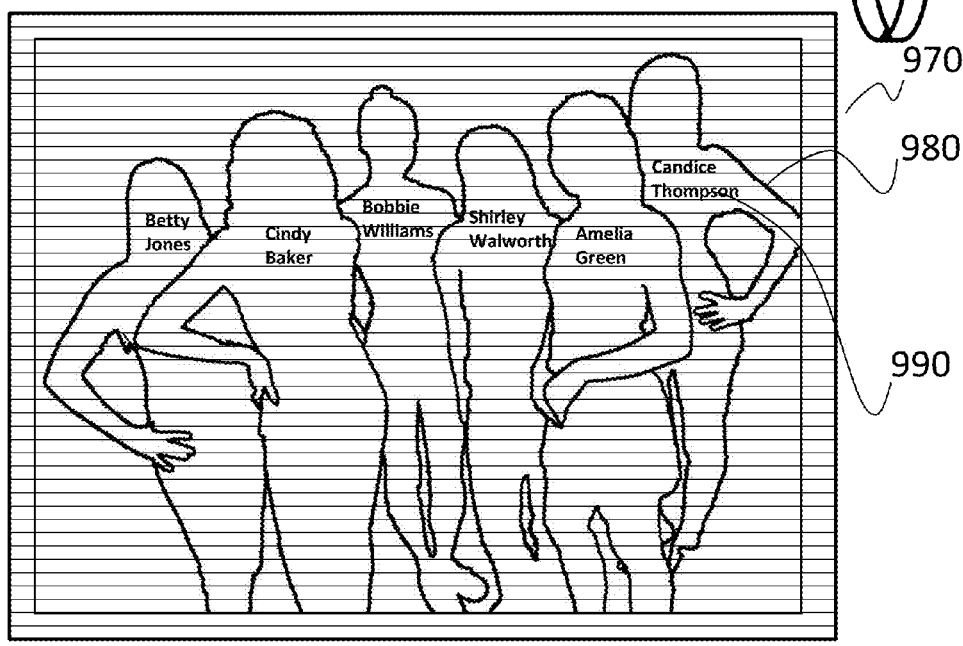
FIG. 12b is an illustration of group scene showing six individuals and annotated outline printed in a series of alternating horizontal lines including a lenticular or barrier overlay, in the second viewing position displaying the annotated outline.

FIG. 12b is an illustration of group scene showing six individuals and annotated outline printed in a series of alternating horizontal lines including a lenticular or barrier overlay, in the second viewing position displaying the annotated outline. A multi-view print incorporating a lenticular or barrier in the second viewing position 970, a printed image of the annotated outlines of the group of six individuals, printed in a series of equally spaced and separated horizontal lines 980, the annotation identifying one of the individuals 990. An alternative embodiment of this technique, not shown, includes incorporating a third set of equally spaced horizontal image segments including group scene 950, outlines 980, and annotations 990, so that three viewing angle dependent images are available. This would provide an additional image that would incorporate the group scene image 950, outlines 980, and annotations 990 all simultaneously visible at one of the viewing positions.

Figure 13A:
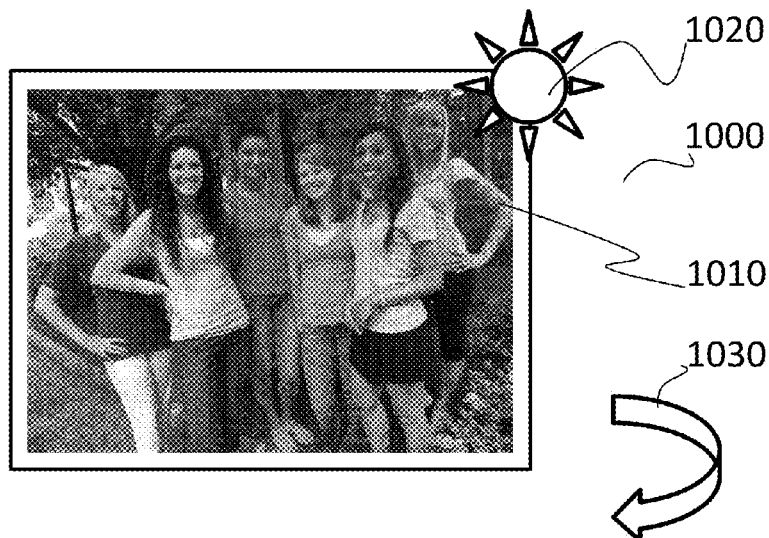
FIG. 13a is an illustration of group scene showing six individuals printed on the front surface of a translucent display media and illuminated from the front side.

FIG. 13a is an illustration of group scene showing six individuals 1010 printed on the front surface of a translucent display media 1000. A suitable translucent media capable of duplex printing, such as "KODAK PROFESSIONAL UV-Curable Display Film—Plus" which can be back-lit or front-lit can be used for this application. Any suitable translucent print media capable of accepting inkjet, silver halide, electrophotographic, thermal, or other duplex digital image printing techniques may be used for this embodiment. Alternatively, two pieces of single sided translucent media can be used if it assembled "back to back" after printing or transparent media can also be used if a white light diffusion layer is added in between two sheets of printed transparent media. When single sided media is used it can be attached mechanically with a frame, clips, or staples, or laminated using heat, chemical, of pressure sensitive adhesives. As taught in U.S. Pat. No. 2,225,307 CONVERTIBLE PICTURE, one printed matter on one side of a transparent, or translucent, material, and another matter on the opposite side of the same material, to appear, or be visible by different, or suitable light effects. FIG. 13a shows the image printed on the front surface of a translucent print 1000 of the scene depicting 6 individuals 1010, being illuminated from the front side as indicated by symbol 1020. Since only the front surface of the translucent print is being illuminated, only the front image of the group scene 1010 is visible. In a normal usage scenario, a user would view with conventional lighting overhead which would typically illuminate the front surface of the print. A symbol indicating the translucent print has been turned exposing the rear surface 1030, the results which will be shown in FIG. 13b.

Figure 13B:
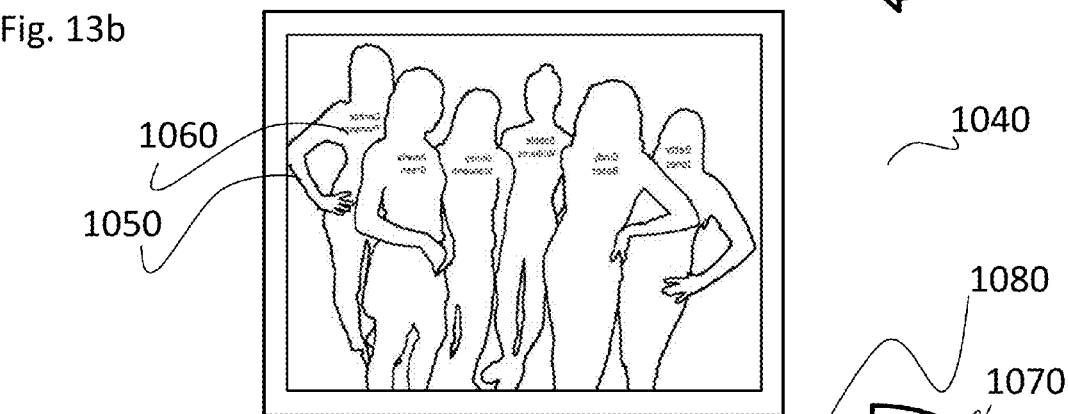
FIG. 13b is an annotated outline of group scene showing six individuals reverse printed on the rear surface of a translucent display media.

FIG. 13b is a reverse printed image annotated outline of the group of 6 individuals 1050 and reverse printed annotations of the group of 6 individuals 1060 on the rear surface of a translucent display media 1040. The illustration shows rear surface of the translucent print in order to convey that the outline 1050 is aligned with the group scene 1010 shown in FIG. 13a. A symbol indicating the translucent print has been turned exposing the front surface 1070, the results which will be shown in FIG. 13c.

Figure 13C:
FIG. 13c is an illustration of group scene showing six individuals printed on the front surface of a translucent display media and an annotated outline of group scene showing six individuals reverse printed on the rear surface of a transflective display film illuminated from the rear side.

FIG. 13c is an illustration of a symbol indicating that the translucent print is being illumination from the rear 1080, the rear illuminated translucent print depicting a group scene of 6 individuals and annotated outline of the group of 6 individuals identifying the individuals. In this usage scenario, the user would typically hold the print up to expose the rear surface of the print to overhead lighting or held in front of a lamp or bright window to make the annotated outline printed on the rear surface of the print visible while viewing the front surface of the print.

The invention has been described in detail with particular reference to certain preferred embodiments thereof, but it will be understood that variations and modifications can be effected within the spirit and scope of the invention.

GLOSSARY OF DESCRIPTIVE TERMS

"Annotated Visual Scene Derived Reference"—an annotated line graphic automatically created from the original group scene. The Visual Reference includes outlines of the individuals within the scene maintaining their original depth information relative to the scene recording device (camera) and providing identification annotation in association the outlines of the individuals.

"Annotated Outline"—a visual graphic outline surrounding individual subjects within a clustered group in order to visually identify individuals within the group, including maintaining the "Z-axis" or row positions of the outlines so that they overlap properly to visually convey the positions of the individuals depicted in the original group scene. By maintaining only the outlines of individuals depicted in the scene, an easy and simple visual reference is created showing the relative proximity of individuals in group shots or scenes with multiple individuals.

"Individual subject"—a person or animal, such as a family pet, with an individual name designation, as opposed to a generically recognized subject. For example, "Bob Jones" or "Skippy" are identified individual subjects as opposed to a "Human Male" or "Dog", which would be intuitively obvious but the individual's identity would remain unknown to the viewer without prior knowledge of the individual.

"Non-obscuring"—printed media means for providing the information and visual references without interfering with the visual scene as with a visual reference printed adjacent to the visual scene or the option to select and remove the visual reference as with an overlay, multi-view print, or duplex printed translucent material.

"Group Scene"—two or more individuals, including human and animals, with known or discoverable individual identities in a formal pose or spontaneous casual setting within the same field of view of the recording device (camera).

"Automatically creating a line graphic"—using one or more object recognition and segmentation algorithms to identify human and animal subjects in a scene and to produce an outline around each individual subject in a stacked arrangement relative to the position of the original scene recording device (camera).

PARTS LIST

10 Imaging System
20 Imaging Kiosk

30 Touch Screen Display
40 Media Read/Write Port Array
50 Pointing Device
60 Transaction Card Reader
70 Wireless Interaction
80 Wireless Mobile Device
90 Duplex Color Printer
100 Group Scene Image
110 Group Scene Print
120 Large Format Color Printer
130 CD/DVD Reader/Writer
140 Hard Copy Scanner
150 Wireless Router
160 Remote Production Facility
170 System Flowchart
180 "Provide Image" Step
190 "Select Info Print Feature" Step
200 "Identities/Locations Known?" Decision Step
210 "Can Identities/Locations be Determined?" Decision Step
220 "Request Identities/Locations GUI" Step
230 "Associate Subject Identities" Step
240 "Select Format" Step
250 "Detect Faces/Bodies" Step
260 "Segment Images" Step
270 "Identify Segments" Step
280 "Associate Segments" Step
290 "Create Line" Step
300 "Maintain Z-Order" Step
310 "Remove Subject Image" Step
320 "Remove Background Image" Step
330 "Add Subject identity Info" Step
340 "Make Info Print" Step
350 Outline Flow Chart
360 "Get Image" Step
370 "Detect Faces" Step
380 "Select Face" Step
390 "Set Expected Boundaries" Step
400 "Detect/Estimate Pose" Step
410 "Set Regional Terms" Step
420 "Set Boundary Terms" Step
430 "Set Shape Terms" Step
440 "Cut Graph" Step
450 "Create Contour" Step
460 "More Faces" Decision Step
470 "Merge Contour Results" Step
480 Z-Order Position Flow Chart
490 "Get Contours" Step
500 "Get Face Detection Info" Step
510 "Determine Z-order of faces" Step
520 "Sort Contours based on Z-order" Step
530 "Render Contours" Step
540 Soft display of a scene including a group of individuals
550 Group of six individuals
560 An outline constructed around each individual
570 Group of six individuals erased
580 Scene back ground erased
590 Front surface of a print of a scene including a group of six individuals
600 Symbol indicating the print has been turned over
610 Rear surface of a print of a scene including the outlines of a group of six individuals
620 Outlines of a group of six individuals
630 Annotation identifying and individual
640 A print of a scene a group of six individuals and the outlines of a group of six individuals
650 A section of the print including scene a group of six individuals
660 A section of the print including the outlines of a group of six individuals
670 Key indicating the identity of one of the individuals
680 A legend including the keys and identities of the individuals
690 A key and identity of one of the individuals
700 A transparency print of a scene including the annotated outlines of a group of six individuals
710 The transparency print of a scene overlaying the print of the scene including a group of six individuals
720 A print of a scene including the group of six individuals and the annotated outlines of the group of six individuals
730 A section of the print including the annotated outlines of a group of six individuals
740 A print of a scene including the group of six individuals and the outlines of the group of six individuals
750 A section of the print including annotated indicators associated with outlines of a group of six individuals
760 An annotated indicator indicating the identity of one of the individuals
770 A print of a scene including the group of six individuals and the reduced scale outlines of the group of six individuals
780 A section of the print including the reduced scale outlines of a group of six individuals
790 A print of a scene including the group of six individuals on the right side of a reflective print portion of a print media and the reverse printed annotated outlines of the group of six individuals on the left side of a transparent portion of the print media
800 A symbol indicating a fold line between the reflective print portion of a print media and the transparent portion of the print media
810 The reverse printed annotated outlines of the group of six individuals on the left side of the transparent portion of the print media
820 The reverse printed annotated outlines of the group of six individuals
830 The reverse printed annotations of the group of six individuals
840 The print of a scene including the group of six individuals on the left side of a reflective print portion of a print media
850 Symbol indicating the print has been folded at the fold line
860 The transparency portion of the print of the reverse printed annotated outline folded and overlaying the print of the scene including a group of six individuals
870 A print of a scene including the group of six individuals on the bottom of a reflective print portion of a print media and the reverse printed and inverted annotated outlines of the group of six individuals on the top of a transparent portion of the print media
880 The reverse printed and inverted annotated outlines of the group of six individuals on the top transparent portion of the print media
890 The reverse printed and inverted annotated outlines of the group of six individuals
900 The reverse printed and inverted annotations of the group of six individuals
910 The print of a scene including the group of six individuals on the bottom of a reflective print portion of a print media 920 The transparency portion of the print of the reverse printed and inverted annotated outline folded and overlaying the print of the scene including a group of six individuals 930 A multi-view print incorporating a lenticular or barrier in the first viewing position 940 The lenticular or barrier cover sheet 950 A printed image of the scene depicting 6 individuals, printed in a series of equally spaced and separated horizontal lines 960 Symbol indicating the changeable viewing position of the multi-view print 970 A multi-view print incorporating a lenticular or barrier in the second viewing position 980 A printed image of the annotated outlines of the group of six individuals, printed in a series of equally spaced and separated horizontal lines 990 The annotation identifying one of the individuals 1000 A translucent print of the scene depicting 6 individuals, with the image printed on the front surface of the print 1010 A scene depicting 6 individuals 1020 A symbol indicating that the translucent print is being illumination from the front 1030 A symbol indicating the translucent print has been turned exposing the rear surface 1040 The rear surface of the translucent print depicting the reverse printed annotated outline of the group of 6 individuals 1050 Reverse printed image annotated outline of the group of 6 individuals 1060 Reverse printed annotations of the group of 6 individuals 1070 A symbol indicating the translucent print has been turned exposing the front surface 1080 A symbol indicating that the translucent print is being illumination from the rear 1090 A rear illuminated translucent print depicting a group scene of 6 individuals and annotated outline of the group of 6 individuals identifying the individuals

What is claimed is:

1. A method of creating a hardcopy photo product of a recorded scene of a group of individuals, the method comprising:
   a) obtaining, at a processor, an image of a scene with two or more individuals;
   b) the processor analyzing the scene to automatically create a line graphic that outlines the individuals within the scene while maintaining their positions relative to the scene recording device;
   c) the processor extracting the created line graphic image from the scene image;
   d) the processor obtaining identification of individuals within the scene;
   e) the processor annotating the created line graphic image with the obtained identification information;
   f) the processor formatting the recorded scene image and the annotated line graphic image to produce a hardcopy photo product that includes the annotated line graphic image to provide visual identification information related to the individuals depicted in the scene image without obscuring the scene image; and
   e) producing the formatted hardcopy photo product.

2. The method of claim 1 wherein the identification of the individuals within the scene is obtained from facial recognition.

3. The method of claim 1 wherein the identification of the individuals within the scene is obtained from metadata related to the recorded scene image.

4. The method of claim 1 wherein the identification of the individuals within the scene is obtained from a user operating a user input device.

5. The method of claim 1 wherein the identification of the individuals within the scene is obtained from information provided by a social network.

6. The method of claim 1 wherein the two or more individuals within the scene comprises people and/or animals, with individual name designations.

7. The method of claim 1 wherein the method of the invention is performed on a phone, tablet, personal computer, or retail photo kiosk either locally on the device or connected via a communications network to a remote processor.

8. The method of claim 1 wherein the formatting of the photo product includes the scene image of one side of a print media and the annotated line graphic image on the other, the scene image and the annotated line graphic image on separate portions of the same side of a print media, the scene image printed on reflective media and the annotated line graphic image printed on a separate transparent print media, the scene image and a reduced scale version of the annotated line graphic image on separate portions of the same side of a print media, the scene image printed on reflective portion of a print media and the annotated line graphic image is reverse printed on an adjacent and attached transparent print media, the scene image and the annotated line graphic image are interspersed and printed on a lenticular or barrier multi-view print media, or the scene image printed on front surface translucent or transparent print media and the annotated line graphic image is reverse printed and aligned to the scene image on the rear surface of the translucent or transparent print media.

9. The method of claim 1 wherein the format for the photo product is selected from a group of softcopy displayed format options by the user.

10. The method of claim 1 wherein the analysis of the scene content to automatically create a line graphic that outlines the individuals within the scene maintaining their positions relative to the scene recording device includes at least one algorithmic technique including graph cut image segmentation, edge detection, pose consistency, pose clustering, scale-invariant feature transform (SIFT), speeded up robust features (SURF), and/or simple interactive object extraction (SIOX).

11. The method of claim 1 wherein the processor extracting the created line graphic image from the scene image comprises the processor automatically extracting the created line graphic image from the scene image.

12. The method of claim 1 wherein the processor obtaining identification of individuals within the scene comprises the processor automatically obtaining identification of individuals within the scene.

13. The method of claim 1 wherein the processor annotating the created line graphic image with the obtained identification information comprises the processor automatically annotating the created line graphic image with the obtained identification information.

14. The method of claim 1 wherein the processor formatting the recorded scene image and the annotated line graphic image to produce a hardcopy photo product that includes the annotated line graphic image to provide visual identification information related to the individuals depicted in the scene image without obscuring the scene image comprises the processor automatically formatting the recorded scene image and the annotated line graphic image to produce a hardcopy photo product that includes the annotated line graphic image to provide visual identification information related to the individuals depicted in the scene image without obscuring the scene image.

15. The method of claim 1 further comprising automatically generating the hardcopy photo product with a visual annotated alpha numeric graphic legend to provide additional information related to the printed image without obscuring the printed image.

* * * * *